United States Patent
Leary et al.

(10) Patent No.: US 9,676,332 B2
(45) Date of Patent: Jun. 13, 2017

(54) PANORAMA PROJECTION UNIT FOR A MOTOR VEHICLE

(71) Applicant: GM GLOBAL TECHNOLOGY OPERATIONS LLC, Detroit, MI (US)

(72) Inventors: David Leary, Warwickshire (GB); Borris Ilse, Mainz (DE); Boris Jacob, Wiesbaden (DE); Jong Won Kim, Frankfurt (DE); Lionel Silva Santos, Ruesselsheim (DE); Ivo van Hulten, Franfurt (DE); Martin Schaufler, Mainz (DE); Martin Golly, Saulheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 14/458,060

(22) Filed: Aug. 12, 2014

(65) Prior Publication Data
US 2015/0042751 A1  Feb. 12, 2015

(30) Foreign Application Priority Data
Aug. 12, 2013 (DE) .......................... 20 2013 007 159

(51) Int. Cl.
*H04N 7/00* (2011.01)
*B60R 1/00* (2006.01)
(Continued)

(52) U.S. Cl.
CPC ............... *B60R 1/00* (2013.01); *B60K 35/00* (2013.01); *B60K 37/02* (2013.01); *B60R 11/0229* (2013.01); *G03B 21/147* (2013.01); *G03B 21/60* (2013.01); *G03B 29/00* (2013.01); *H04N 9/3147* (2013.01); *B60K 2350/1072* (2013.01); *B60K 2350/2052* (2013.01); *B60R 2011/0005* (2013.01); *B60R 2300/20* (2013.01); *B60R 2300/8066* (2013.01); *G03B 21/62* (2013.01); *G03B 37/04* (2013.01)

(58) Field of Classification Search
CPC ...................................................... H04N 9/3147
USPC .......................................... 345/419; 348/36
See application file for complete search history.

(56) References Cited

U.S. PATENT DOCUMENTS 8,142,030 B2   3/2012  Bowden et al.
2008/0122799 A1 *  5/2008  Pryor .................... G06F 3/0312
                                                            345/173

(Continued)

FOREIGN PATENT DOCUMENTS

DE    19620199 A1   11/1996
DE    19730563 A1   2/1999
(Continued)

Primary Examiner — Hung Dang
Assistant Examiner — Girumsew Wendmagegn
(74) Attorney, Agent, or Firm — Lorenz & Kopf LLP

(57) ABSTRACT

A panorama projection unit is disclosed which concentrates the projected images in a front area of the motor vehicle and temporarily or locally shades the projection beams between projection units and the display surfaces. The panorama projection unit includes a three-dimensional panoramic screen, a plurality of projectors which project images onto a rear side of the panoramic screen, and a central control unit which controls the projectors in such a way that the projected images are mapped without distortion on the three-dimensional panoramic screen.

19 Claims, 7 Drawing Sheets

(51) Int. Cl.
  B60K 35/00    (2006.01)
  B60R 11/02    (2006.01)
  G03B 21/14    (2006.01)
  G03B 21/60    (2014.01)
  H04N 9/31     (2006.01)
  G03B 29/00    (2006.01)
  B60K 37/02    (2006.01)
  B60R 11/00    (2006.01)
  G03B 21/62    (2014.01)
  G03B 37/04    (2006.01)

(56) References Cited

U.S. PATENT DOCUMENTS

| | | | | |
|---|---|---|---|---|
| 2011/0261089 | A1* | 10/2011 | Ohnishi | G09G 3/3426 345/690 |
| 2012/0169684 | A1* | 7/2012 | Sultan | H04N 9/3147 345/207 |
| 2013/0100069 | A1* | 4/2013 | Kwon | G06F 3/044 345/174 |
| 2013/0134730 | A1* | 5/2013 | Ricci | G06F 9/54 296/24.34 |
| 2014/0267585 | A1* | 9/2014 | Chen | H04N 5/23238 348/36 |

FOREIGN PATENT DOCUMENTS

| | | |
|---|---|---|
| DE | 102004005154 A1 | 8/2005 |
| DE | 102007029602 A1 | 1/2009 |
| EP | 1798588 A1 | 6/2007 |
| EP | 2520453 A1 | 11/2012 |

\* cited by examiner

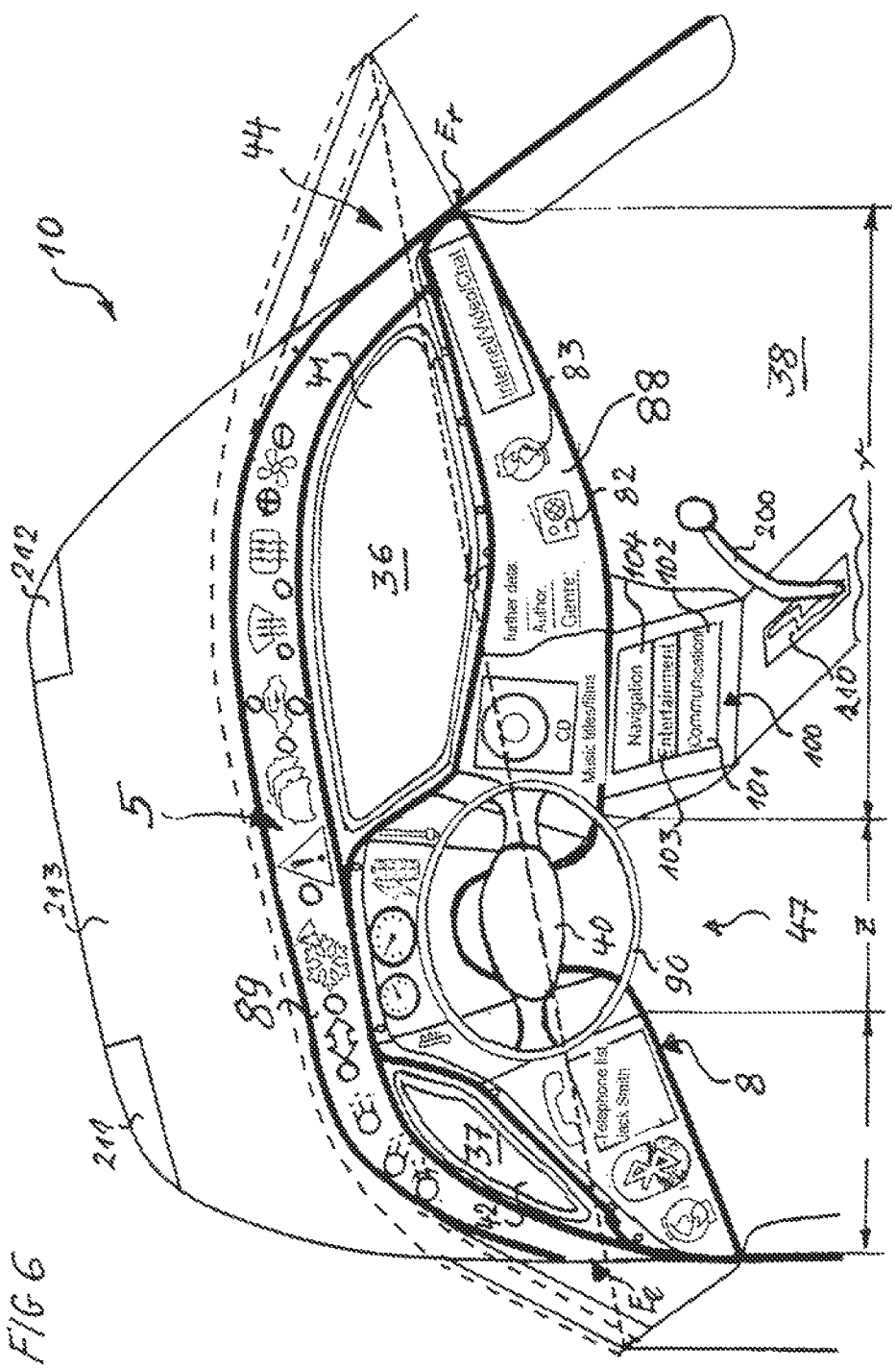

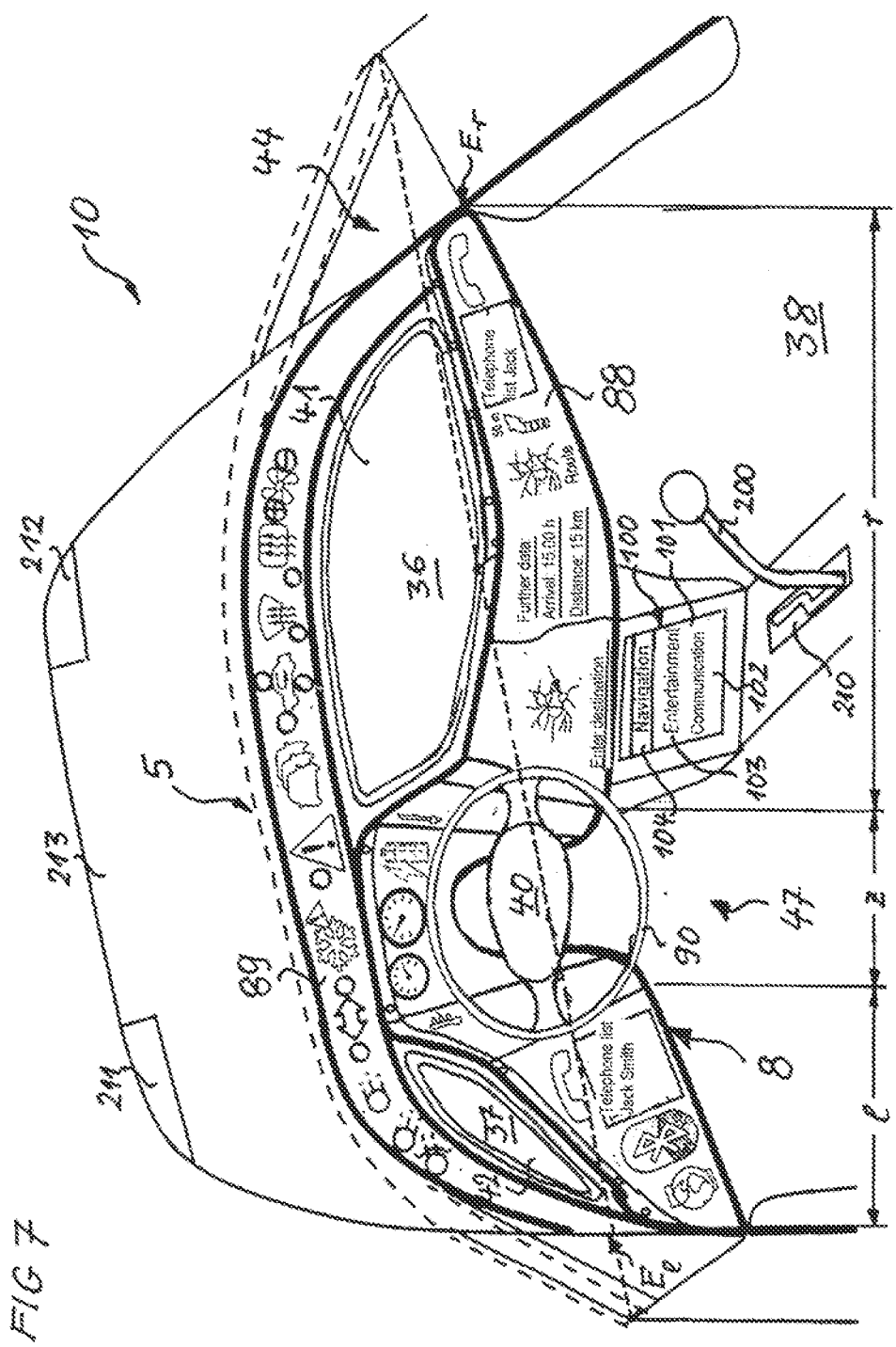

PANORAMA PROJECTION UNIT FOR A MOTOR VEHICLE

CROSS REFERENCE TO RELATED APPLICATION

This application claims priority to German Patent Application No. 202013007159.1 filed Aug. 12, 2013, which is incorporated herein by reference in its entirety.

TECHNICAL FIELD

A panorama projection unit for a motor vehicle is described.

BACKGROUND

In general, motor vehicles include display devices which normally are vacuum fluorescence displays (VFD) or liquid crystal displays (LCD) for displaying operational data. Such display devices show, for example, the state of safety components such as electronic safety assistants or comfort devices of the vehicle which indicate seat adjustment, seat heating, window lifters, external mirror settings or other infotainment components, including for example, a navigation system or a car radio.

The specification EP 1 798 588 B1 has further disclosed a control system to control functions in a motor vehicle. To this end different display surfaces and display devices are provided in different positions on surfaces inside the vehicle. The display devices are used for the graphic display of images and virtual control elements inside the vehicle. Detection units detect operator entries when the virtual control elements are actuated. A control device is data-connected with the detection units and the display devices on the different display surfaces for displaying the virtual control elements in dependence of the detected operator entries. To this end, projection units are distributed throughout the inside of the vehicle to project pictures of the images and the control elements onto a projection surface from different projection angles.

Due to the plurality of images and information which can be visually displayed, conventional dashboards equipped with such imaging devices may become clutter or may divert the attention of a driver from essential information such as the traffic. Therefore, display devices and images are provided in the vehicle which produce a virtual picture visible for the viewer in the area of the windscreen. Such devices are called head-up displays (HUDs).

These known display devices require a considerable amount of installation space in a motor vehicle. Moreover the plurality of vehicle functions to be controlled together with their associated images and control elements on virtual and real screens leads to a confusing overall layout which may be distracting to the driver due to the complexity and multitude of images and control elements during actuation of such control elements.

SUMMARY

In accordance with the present disclosure, a panorama projection unit is provided which concentrates the projected images in a front area of the motor vehicle and temporarily or locally shades the projection beams between projection units and the display surfaces. The panorama project unit described herein reduces the error rate of conventional systems and achieves improved creative freedom in the arrangement and the display of imaging and control functions.

One embodiment of the present disclosure is a panorama projection unit for a vehicle, which includes a three-dimensional panoramic screen, a plurality of projectors which project images onto a rear side of the panoramic screen, and a central control unit which controls the projectors in such a way that the projected images are mapped without distortion on the three-dimensional panoramic screen. Such a panorama projection unit has the advantage that the projection beams can no longer be influenced and disturbed by the vehicle occupants or the driver inside the vehicle because the projectors are arranged behind the panoramic screen exposed towards the interior space of the vehicle and the imaging system with its projection beams is thus completely shielded from the driver and passenger inside the vehicle.

In one embodiment the three-dimensional panoramic screen is adapted in its width at least partially to the internal front width of the vehicle. This has the advantage that the plurality of the existing different indicating, displaying and control devices are no longer needed because of the large panoramic screen covering the full width of the vehicle interior. On the one hand this results in spatial advantages for the manufacturer and on the other, in improved creative freedom and reduced manufacturing costs as well as considerable weight savings. Instead of many separate indicating devices and projection surfaces a large panoramic screen takes over both imaging functions and control functions.

Due to a virtual display of the respectively momentarily desired images and control elements, the conventional physical arrangement of all available images and control elements can be omitted. This would have the effect of making the layout of the entire dashboard area of the vehicle more clearly, which allows greater creative freedom both to the manufacturer and the driver of the vehicle. Besides, any amount of vehicle functions can be clearly displayed by individual control symbols or control elements by means of the rear-side projectors, because only the symbols and control elements momentarily needed or very probably just about to be selected can be displayed on the panoramic screen. The images and/or control elements probably not needed are not shown, and therefore do not require any additional space in the front area of the vehicle. Finally it is a fact that projectors of this kind are now available on the market, which are very low weight correspondingly small in size.

In a further embodiment of the present disclosure provision is made for the panoramic screen to include a semi-transparent rear-side coating on its back and an anti-reflection coating on its front. Such anti-reflection coatings have the effect of preventing annoying reflections, which may be caused by display coverings or vehicle windows. Due to the interaction between the semi-transparent rear-side coating on the back of the panoramic screen and the anti-reflection coating on the front of the panoramic screen, the panoramic screen is color-shaded in those areas in which no projector happens to be active. The color shading can be selected by the manufacturer in order to achieve a pleasing effect upon driver and vehicle occupants.

Further provision is made for the panoramic screen to include a transparent plastic material, in particular polymethylmethacrylate (PMMA) or polycarbonate (PC). Such plastic materials are distinctly lighter than glass or ceramics so that the total weight of all mapped components in the front area of the vehicle can be reduced since these functions are now assumed by the panoramic screen made from a transparent plastic.

In a further embodiment of the present disclosure the panoramic screen is composed of at least two or more parts, wherein each part has at least one projector or a group of projectors assigned to it, and at least two parts are adjacent to each other. Such a panoramic screen composed of at least two parts with associated groups of projectors has the advantage that several parts can be joined together to form a panorama projection unit, thereby saving both manufacturing and assembly costs.

In a further embodiment of the present disclosure the images are mapped onto the three-dimensional panoramic screen by rear-side projectors in such a way that the three-dimensional panoramic screen shows neither overlapping images nor unused surfaces between the images. A control algorithm is used to map which controls and/or regulate the mapping areas and transitions of the projection surfaces on the three-dimensional panoramic screen.

In a further embodiment of the present disclosure two projectors rows are arranged one above the other. To this end a lower projector row may be directed onto the rear-side of a lower panoramic screen part and an upper projector row may be directed onto the rear-side of an upper panoramic screen part. In such an embodiment the lower projector row projects images and control elements onto a lower panoramic screen part, and an upper projector row projects images and control elements onto an upper panoramic screen part.

In addition, the lower panoramic screen part may be partially spatially offset relative to the upper panoramic screen part in such a way that horizontal storage surfaces are formed between the upper and the lower panoramic screen parts. The horizontal storage surfaces can be utilized in a further embodiment of the present disclosure for arranging safety system such as front airbags below these horizontal storage surfaces. These front airbags can supplement a front airbag arranged for the driver in the center of the steering wheel on the steering column and act as a "safety net" for the passenger in case of frontal collisions.

In a further embodiment of the present disclosure provision is made for the projectors to include light diodes or light diode arrays or laser diodes or laser diode arrays, in particular in the form of Pico beamers. These projector variants can be constructed with very small dimensions and can be integrated in a simple and cost-effective manner with the panoramic screen to form the panorama projection unit.

Such projectors of the panorama projection unit may project further images onto the panoramic screen including actual values of predefined vehicle systems such as a comfort system, an infotainment system, a safety system or the like. Thus, the panorama projection unit includes both an imaging function for mapping system values and operable control elements which can activate a mapped function by, for example, guiding a finger over contact points or proximity sensors provided on or behind the panoramic screen.

Moreover provision is made in a further embodiment of the present disclosure, in case of the vehicle reversing, for the panorama projection unit to project a video feed from a camera mounted at the rear of the vehicle in the external rear area of the vehicle, onto the rear-side of the panoramic screen. Since this projection is required only when the vehicle is reversing, all other images and control elements not necessary for reversing can be temporarily vanish from the panoramic screen thus enabling the driver to fully concentrate onto the reversing operation.

Moreover, provision is made in a further embodiment of the present disclosure, to project instrument readings of vehicle speed, engine revolutions, coolant temperature, fuel level and other driving-related data such as flashing indicator lights, warning indicator lights and/or lighting levels onto an area on the driver's side of the panoramic screen. These projections are projected onto the panoramic screen in the visual range of the driver only when the vehicle is driving forward.

Furthermore, the panoramic screen may include a device including control elements and projection backlit images with associated means for menu selection. Control is provided by a central control unit for a projection of graphic images and control elements in dependence of the detected operator entries by a detection unit and the projection unit. To this end, the detection unit and the projection unit are data-connected via respective signal lines. The central control unit may include one or more digital signal processors (DSPs) or one or more microprocessors (CPUs).

In this way, changeable images and control elements can be graphically displayed in real time on the common projection surface of the panoramic screen. Several menu levels can be displayed and selected in a separate parameter field. The central control unit controls the projectors in such a way that new graphic symbols are displayed on the panoramic screen at the menu level associated with the actuated graphic control element. This makes it possible to refer back to stored data records when displaying different images, symbols and/or control elements on the existing panoramic screen. The graphic images and control elements may, at least partially, be advantageously provided as variable or changeable images and control elements with a menu level structure. The central control unit controls the projectors of a graphic representation or an operable control element by actuating a predefined virtual control element via respective inferior or superior menu levels.

In principle. the central control unit can also control the projectors for displaying a user-defined menu level with preselected images and control elements. The central control unit recognizes the current user by means of a key fob and controls the projection device to display the starting menu level associated with this user. Also user-defined menu levels can be displayed with preselected images and control elements in dependence of certain driving situations.

Moreover it is feasible that the central control unit controls the projectors to display effective images and control elements in dependence of certain momentary driving parameters. For example, when tire slippage is measured the control elements for activating the automatic slip control system (ABS) can be displayed. Also if a vehicle accident is detected emergency call numbers, the warning flashlight symbol and other meaningful images of operable control elements can be displayed by the projectors in the associated areas of the panoramic screen.

At the same time any overload of the panoramic screen is avoided in that only momentarily meaningful images and control elements to be very probably selected are displayed to the user on the panoramic screen. Besides it is possible for the panorama projection unit to trigger an acoustic, haptic or visual feedback when the provided contact points of virtual control elements are actuated, resulting in the user being informed that his entry has been recognized by the panorama projection unit.

The virtual images and control elements are associated with different vehicle functions. These vehicle functions may, for example. be safety functions, comfort functions, infotainment functions, special functions of special vehicles or other imaginable functions. A menu selection may optionally include communication systems, navigation systems, driver assistance information systems etc. as well as indication and operator selection or voice control.

BRIEF DESCRIPTION OF THE DRAWINGS

The present disclosure will hereinafter be described in conjunction with the following drawing figures, wherein like numerals denote like elements.

FIG. 6 shows a schematic perspective view of a panorama projection unit according to FIG. 5 with an information center including an entertainment system;

FIG. 7 shows a schematic perspective view of a panorama projection unit according to FIG. 5 with an information center including images and control elements of a navigation system.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
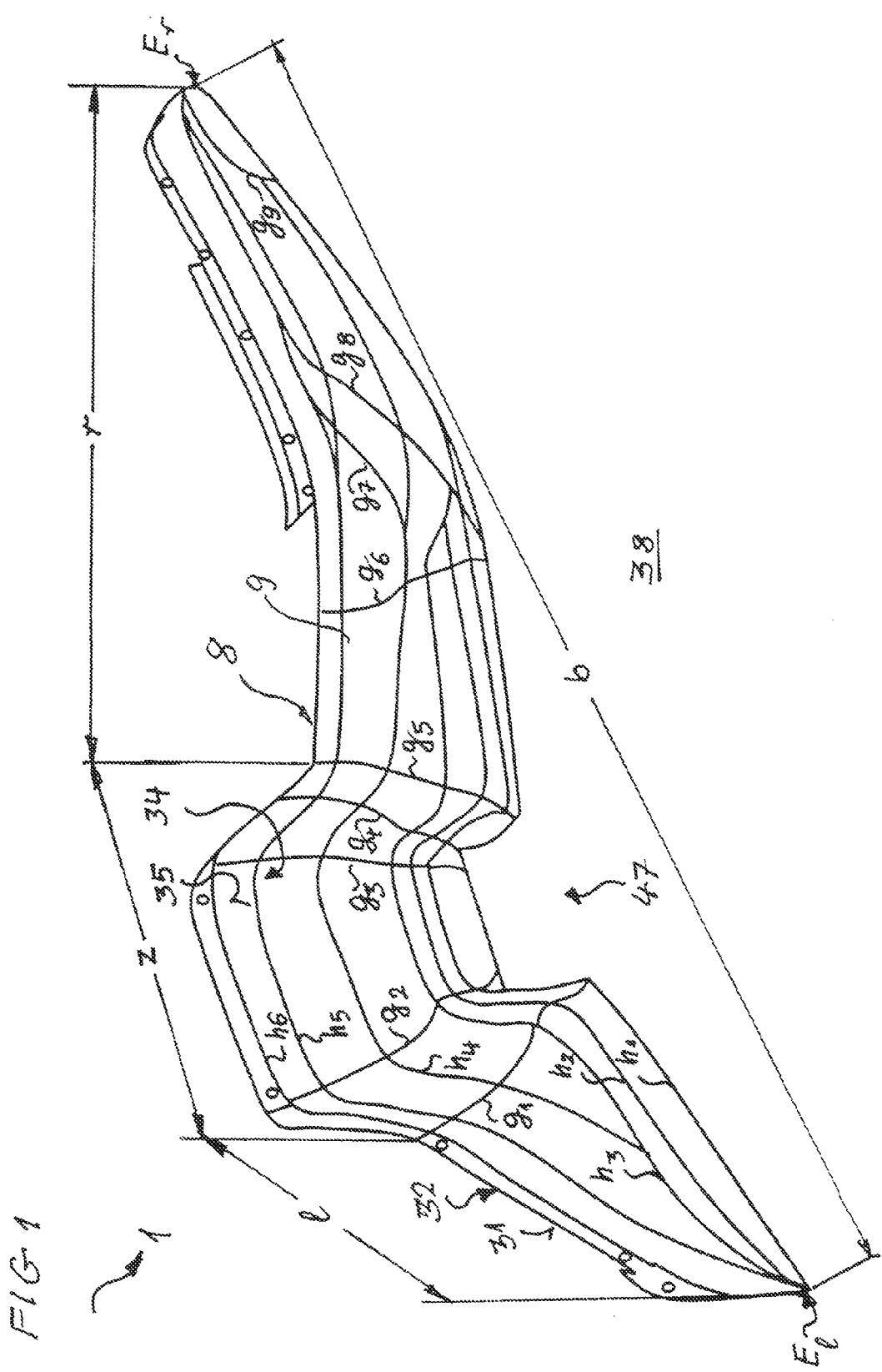
FIG. 1 shows a schematic perspective view of a three-dimensional panoramic screen of a panorama projection unit according to an embodiment of the present disclosure.

FIG. 1 shows a schematic perspective view of a three-dimensional panoramic screen 8 of a panorama projection unit 1 in a front area 47 of a vehicle interior space 38. The panoramic screen 8 according to a first embodiment of the present disclosure includes a width b which corresponds to the internal front width of a vehicle. The panoramic screen 8 is composed of three areas, a left-hand area 1 arranged to the left of a steering column not shown, a central area (z) with an indentation for a steering column within the visual range of the driver, and a right-hand area (r) arranged to the right of the steering column not shown and fully within the visual range of a passenger.

Contour lines $h_1$, $h_2$, $h_3$, $h_4$, $h_5$ and $h_6$ indicate the spatial three-dimensional shape of the panoramic screen 8. Furthermore; border lines $g_1$ through $g_9$ can be seen which limit individual areas of the panoramic screen 8. Thus, the left-hand area 1 extends from a left end $E_1$ to a first border line $g_1$. The central area (z) extends from the border line $g_1$ to the border line $g_5$. The right-hand area (r) extends from the border line $g_5$ to the right-hand corner $E_r$ of the panoramic screen 8. A panoramic screen 8 of this type may also include three single areas l, z and r.

The panoramic screen 8 shown in FIG. 1 has a front side 35 to which an anti-reflection coating 34 has been applied. An anti-reflection coating of this kind has a thickness lying within the micrometer range for ensuring that the images on the panoramic screen 8 are not optically impaired neither through window reflections nor through reflections from a covering. Further the panoramic screen 8 includes a transparent panoramic pane 9 manufactured from a transparent plastic such as polymethylmethacrylate (PMMA) or polycarbonate (PC). A rear-side 31 of the pane 9 is provided with a semi-transparent rear-side coating 32. The semi-transparent rear-side coating 32 obscures the projectors which irradiate the rear side 31 of the panoramic screen 8 (not shown here) from the front side 35.

The entire surface of the panoramic screen 8 appears almost uniformly opaque when the projectors directed at the rear-side 31 are switched off. Both the anti-reflection coating 34 on the front side 35 and the semi-transparent coating 32 on the rear-side 31 can ensure that the panoramic screen appears to the viewer as if it were colored. For example, a silicon dioxide layer deposited on the front side 35 with a thickness between 0.1 and 0.8 µm can cause the surface of the panoramic screen 8 to appear blue, green, yellow or orange. Also finely distributed color pigments in the rear-side coating 32 on the rear side 31, which do not affect the image projected on the back, can produce a predefined color effect for the viewer of the panoramic screen, when the projectors are switched off.

Figure 2:
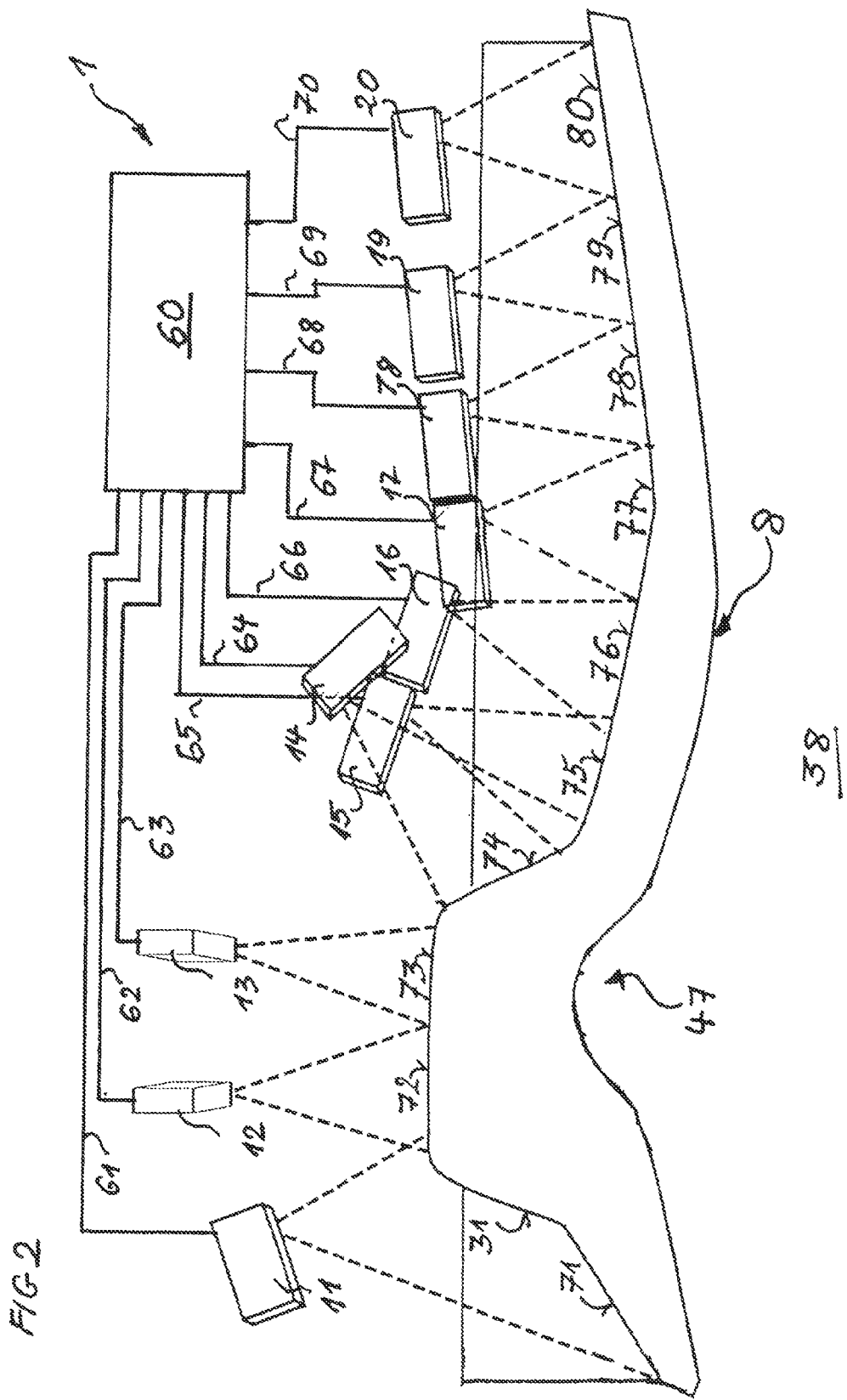
FIG. 2 shows a schematic view of the panorama projection unit according to FIG. 1.

FIG. 2 shows a schematic view of a panorama projection unit 1 according to a first embodiment of the present disclosure shown in FIG. 1. In FIG. 2 only the outline of the panoramic screen 8 and the projectors 11-20 arranged behind the panoramic screen 8 are shown. The projectors 11-20 direct beams onto the rear-side 31 of the panoramic screen 8 and form projection surfaces 71-80. To this end the projectors 11-20 are connected via signal lines 61-70 with the central control unit 60, which ensures that the projection surfaces 71 and 72, 74 and 75 as well as 75 and 76 shown here as overlapping, are in fact not overlapping and that no gaps occur between the projection surfaces as shown in FIG. 2 between the projection surfaces 73 and 74.

Thus the three-dimensional panoramic screen 8 can be completely irradiated from the rear side 31 by the projectors 11-20 with images and without overlapping or gaps or transitions. The projectors 11-20 can map various image elements onto the associated projection surfaces 71-80. In particular, actual values of vehicle systems and control elements of vehicle functions are projected. For example, it is possible to project actual values of safety systems such as a tire-pressure monitoring device, a gradiometer, an inclinometer or a parking assistant onto one of the projection surfaces 71-80.

Operable control elements in the form of control points not shown may be provided on the panoramic screen 8 that can be actuated to call up functional areas such as for comfort, safety or infotainment. Examples of such imaging and control elements may be for heating, venting, and air conditioning system, seat adjustment, seat heating or seat ventilation, electric window lifters, electrically adjustable external mirrors, an audio system, a DVD video system, a tuner of a DAB system, a mini disc, a MP3, DVD or audio player. Furthermore navigation systems, ESP systems or the like can be activated and adjusted or controlled on the panoramic screen by touching the relevant touchscreen points. Also information of a digital traffic system, an internet system, a television system or a digital travel guide as well as a telephone system can be displayed as elements or as values in descriptive symbols on the projection surfaces 71-80. Furthermore it is possible to display actual states of imaging and control elements of special vehicles, such as of a taximeter, an additional searchlight, a siren, a speed monitoring device or the like, on the projection surfaces 71 to 80 of the panoramic screen 8.

Physical control elements can thus be advantageously replaced by virtual control elements. To this end these virtual control elements are projected according to the present embodiments onto predefined masked sections of the projection surfaces 71-80 of the panoramic screen 8. Exemplary embodiments for such projection surfaces with images and control elements are explained in detail further below with reference to FIGS. 5 to 7.

The projected images, graphics, control elements or pictures need not mandatorily be provided in the form of one mask, but several masks may be provided in a magazine of the system or in memory of one of the projectors 11-20 or in memory of the control unit 60. Depending upon the application, it is possible to automatically use the light source of a projector for the respective application function. Alternatively, image production on the panoramic screen 8 may be implemented in various ways, and individual image elements can include different forms and colors, wherein each vehicle function or vehicle application may have a certain color assigned to it. This improves acceptance by the driver and supports the operability of the vehicle.

Besides the graphic images of the control elements of a control can change such that the user receives immediate feedback for his entry. For example, if the blower is adjusted by touching a corresponding contact point, the virtual control element can control the central control unit 60 of the projectors 11-20 in such a way that the respective blower stage and temperature setting are displayed on one of the projection surfaces 71-80.

Moreover, optical detection devices may be used, which without making contact can detect and evaluate the user's entry. In comparison to optical or haptic detection. the contact-sensitive control elements are advantageous. For example activation, control or evaluation can be effected by a change in pressure or by an electromagnetic, in particular capacitive change in the area of the control element. The projection surfaces 71 to 80 may include either a smooth surface without haptic feedback or a structured surface with haptic feedback at the contact points.

Figure 3:
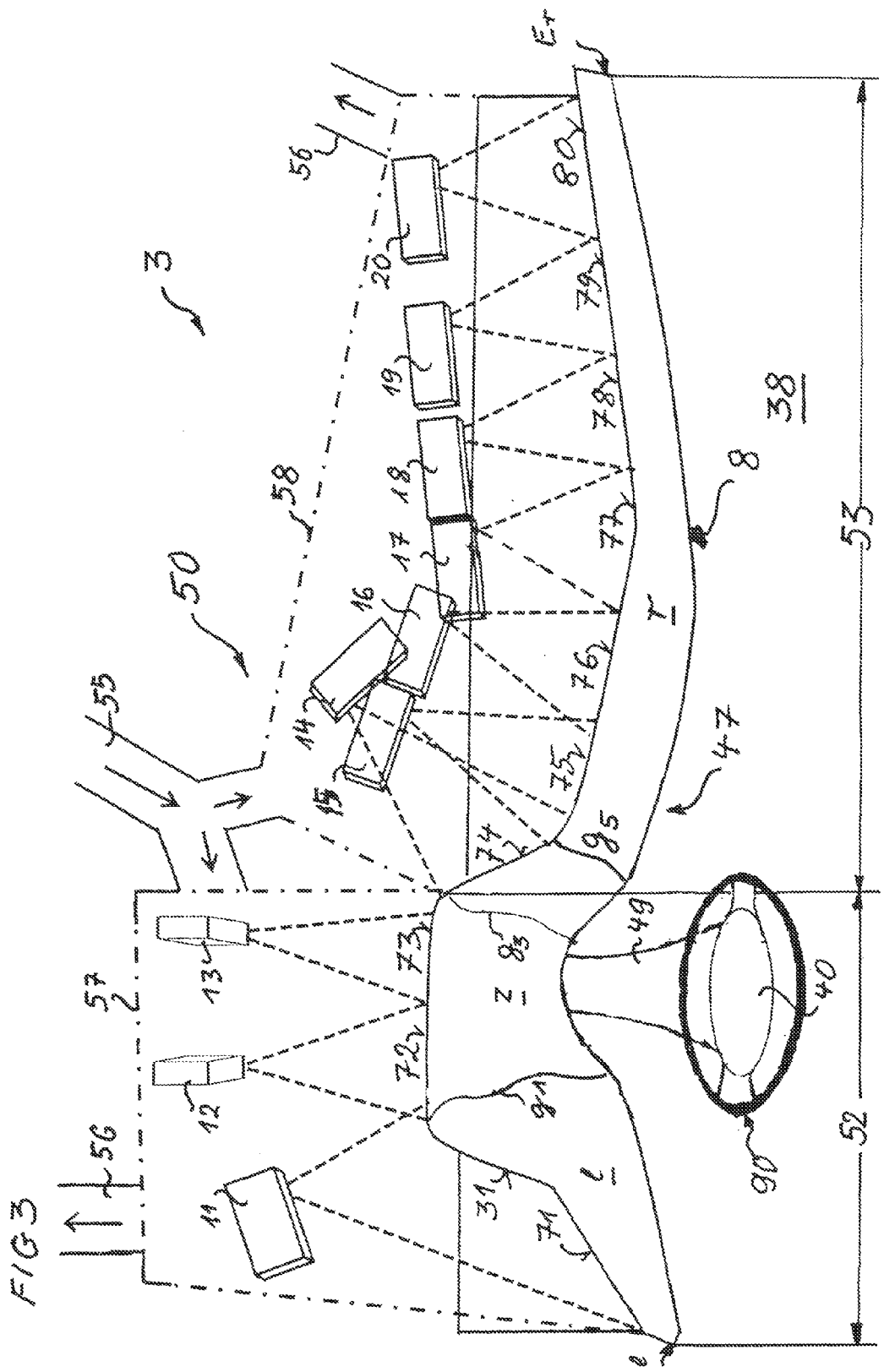
FIG. 3 shows a schematic view of a panorama projection unit according to another embodiment of the present disclosure.

FIG. 3 shows a schematic view of a panorama projection unit 3 according to a further embodiment. FIG. 3 shows the area of a steering column 49 for the driver with a steering wheel 90 and a first front airbag 40 in the center of the steering wheel 90 at the end of the steering column 49 as is the case for conventional vehicles. Ahead in driving direction in the vehicle interior space 38, the front area 47 includes the panoramic screen 8. In this embodiment the panoramic screen may be divided in two generally along the border line $g_3$ and provide two adjacently arranged housing modules 57 and 58, which together with the associated projectors 11-13 and 14-20 and the parameter screen parts $E_l$ to $g_3/g_3$ to $E_r$ form a first slide-in cassette 52 and a second adjacent slide-in cassette 53, respectively.

The housing module 57 encompasses a group of projectors 11, 12 and 13, which cover the left-hand and the central area (l) and (z) of the panoramic screen 8. A second housing module 58 includes a group of projectors 14-20 and essentially covers the right-hand area (r) of the panoramic screen 8. The housing modules 57 and 58 form a housing 50 and ensure intensive cooling of the projectors 11-20 via a cooling air inlet 55 which divides into two forks, one going to the first housing module 57 and the other going to the second housing module 58. Both the first housing module 57 and the second housing module 58 have their own cooling air outlet 56. These two housing modules 57 and 58 with their associated projectors and their panoramic screen areas may be designed as two adjacently arranged cassettes which can be fitted as cassette units 52 and 53 into the front area 47 of a vehicle and electrically connected accordingly. The division in two can ensure that the projectors do not overheat, wherein preferably the cooling air inlet 55 is connected to an air conditioning system of the vehicle.

Figure 4:
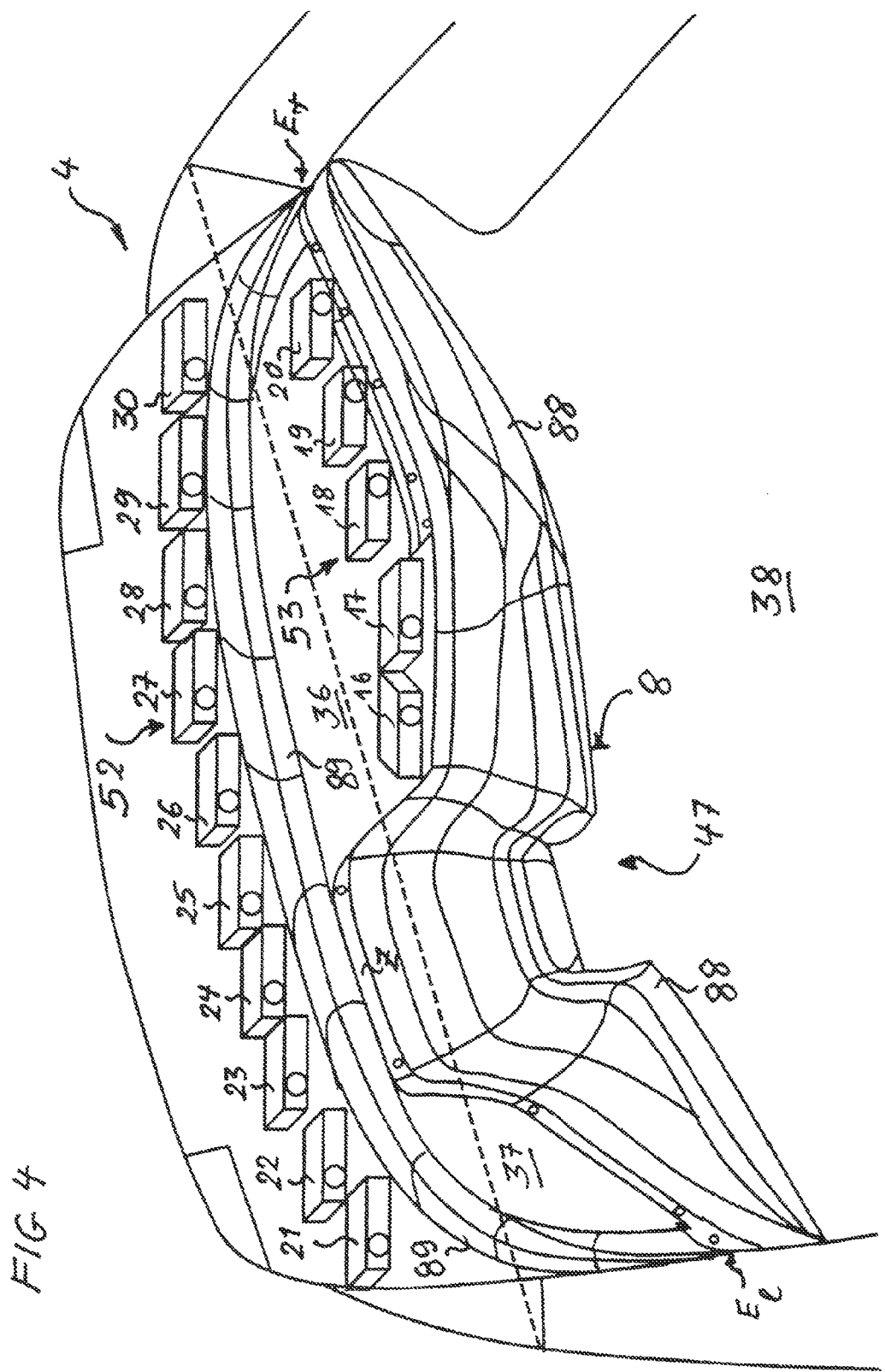
FIG. 4 shows a schematic view of a panorama projection unit according to a further embodiment of the present disclosure.

FIG. 4 shows a schematic view of a panorama projection unit 4 according to a further embodiment of the present disclosure. This panorama projection unit 4 is different from the previous device in that while two groups of projectors are formed, they are arranged as a lower group of projectors including 16-20, and an upper group of projectors including projectors 21-30. The lower group of projectors 16-20 is directed at a lower region 88 of the panoramic screen 8, and the upper group of projectors 21 to 30 is directed at an upper region 89 of the panoramic screen 8. The panoramic screen part 89 and the lower panoramic screen part 88 are arranged spatially offset relative to one another and connected with each other in the central area (z) as well as at their left-hand end $E_l$ and their right-hand end $E_r$. The in-between areas are arranged essentially horizontally and can thus be used as storage surface 36 and storage surface 37, as will be explained further with reference to FIGS. 5 to 7.

Figure 5:
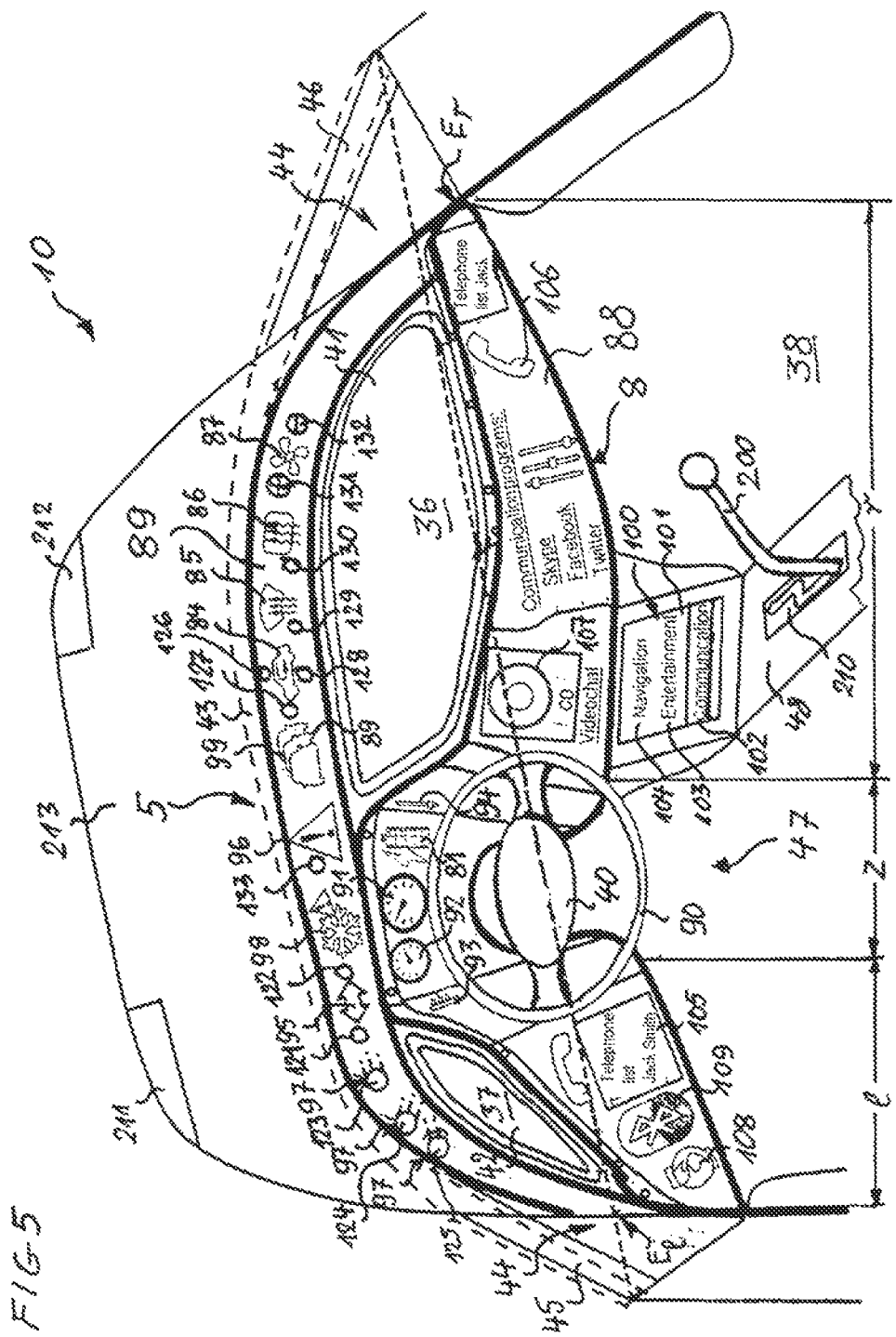
FIG. 5 shows a schematic perspective view of a panorama projection unit according to a further embodiment of the present disclosure with an "information center" including images and control elements of a communication system.

FIG. 5 shows a schematic perspective view of a panorama projection unit 5 according to a further embodiment with an "information center" having images and control elements of a communication system. To this end FIG. 5 schematically shows, in the front area 47 of the vehicle 10, headlights 211 and 212 and a car hood 213. A transition between the car hood 213 and a windscreen 44 indicated by broken lines is formed by windscreen wiper devices (not shown). A cross-member 43 belonging to the chassis of the vehicle 10 forms a stable transition from an engine area to the area of the windscreen 44. The lateral limitation of the windscreen 44 is formed by a left-hand A-column 45 and a right-hand A-column 46, so that the windscreen 44 reaches as far as a roof edge not shown, which is indicated again by a broken line as the upper limitation of the windscreen in FIG. 5.

A gear lever 200 is arranged in this peripheral area 47 of the interior of the vehicle 38 with corresponding shifting gate 210 on a center console 48. Further, FIG. 5 shows a combination element 100 at the transition from the center console 48 to the panoramic screen 8. The panoramic screen 8 here includes a lower panoramic screen part 88 and an upper panoramic screen part 89. An upper panoramic screen part 89 arranged further forward is connected with the lower panoramic screen part 88 in the central area of the panoramic screen 8 and at the left-hand end $E_l$ and the right-hand end $E_r$.

As already shown in FIG. 4, the upper panoramic screen part 89 and the lower panoramic screen part 88 are arranged horizontally offset relative to each other thereby forming two storage surfaces 36 and 37 in between, beneath which two front airbags 41 and 42 may be arranged. The front airbag 41 underneath the covering 36 is for the protection of the passenger, whilst the front airbag 42 underneath the covering 37 supports the central front airbag 40 for the driver.

As shown in FIG. 5, the combination instrument 100 forms a touchscreen with a menu selection 101 which is data-connected to and interacts with the central control unit shown in FIG. 2. In the embodiment shown in FIG. 5, the combination instrument 100 calls up a communication information system 102 so that symbols, characters and letterings appear in the left-hand area (l) of the lower panoramic screen part 88 and in the right-hand area (r) of the lower panoramic screen part 88 for use of the communication information system 102.

The upper panoramic screen part 89 has, for example, standard indicators and possible contact points 12-33 arranged on it, which can be of help while the vehicle is travelling. In the central area (z) moreover, in all shown embodiments of FIGS. 5, 6 and 7 an image of a speedometer 91, an engine tachometer 92, a coolant temperature indicator 93 and a fuel level indicator are provided. The central area additionally shows a battery status image 81, which in particular would be important for hybrid vehicles and electric vehicles.

In the upper panoramic screen part 89, lighting levels 97 are provided close to the driver, which additionally include contact point 123 for high beam, contact point 124 for low beam and contact point 125 for fog light. Furthermore contact points 121, 122 for flashing left and for flashing right are provided within easy reach for the driver, together with an image of a flashing light indicator 95. The program of the central control unit is configured to change both the images in this area and to re-assign or redefine individual contact points.

Furthermore provision is made in this embodiment of the present disclosure for a black ice warning 98 to light up centrally and for switching a warning flashlight indicator 96 off and on, which can be initiated with the aid of a contact point 133. Moving further to the right in this embodiment according to FIG. 5, the upper panoramic screen part 89 includes a congestion warning indicator 99 and finally an air circulation control 84 with three contact points. Contact point 127 is used for activating the air circulation function. Contact point 126 is used for starting upwardly directed ventilation and contact point 128 is used for starting downwardly directed ventilation into the foot area.

Further, the upper panoramic screen part 89 shows, moving towards the right in direction of the passenger, an image of a front screen heater 85 and a rear screen heater 86, which can be activated with the aid of contact points 129 and 130. It is possible to provide additional switching facilities by means of pushbuttons in the area of the steering column.

Finally, a symbol for a blower 87 is provided in FIG. 5 on the right-hand side, which includes a contact point 131 for increasing blower speed and a contact point 132 for reducing blower speed. Although both the arrangement and the assignment of the control elements and the arrangement and assignment of the image symbols can be changed by the central computer unit with the aid of the projectors, the distributions and images on the upper panoramic screen part 89 may remain unchanged for the subsequent FIGS. 6 and 7. The same applies to the central area above the steering wheel or above the steering column, such as the speed indicator 91, the engine tachometer 92, the coolant temperature indicator 93 and the fuel level indicator 94.

The communication system 102 provides a possibility of external communication to both the driver with the telephone service 105 and its own telephone list, and to the passenger with the telephone service 106 and its own telephone list. Internet access 108 and a personal wireless network 109, for example via Bluetooth, are provided for the driver in the left-hand lower area (l) of the panoramic screen part 88. On the right-hand side of the lower panoramic screen part 88 access is provided for the passenger to a CD player 107 and to various communication programs or social networks such as Skype, Facebook, LinkedIn or Twitter. By making a selection on the combination instrument 100 via menu indication 101 further images and control elements of the left-hand area (l) and right-hand area (r) of the lower panoramic screen part 88 can be exchanged or altered as seen FIGS. 6 and 7.

FIG. 6 shows a schematic perspective view of a panorama projection unit 5 of the fifth embodiment according to FIG. 5 with an information center including an entertainment system 103, where the passenger has access to a radio service 82 and also access to the internet 83 as well as to further current data. Whilst the images and service areas in the central area (z) in the left-hand area (l) and in the areas of the upper panoramic screen part 89 remain unchanged. Since the symbols and images are self-explanatory, a detailed explanation of the images and control elements explained in detail with reference to FIG. 5 is omitted here, as is the insertion of corresponding reference symbols, in order to make the representation clearer.

FIG. 7 shows a schematic, perspective view of the panorama projection unit 5 according to FIG. 5 with an information center including images and control elements of a navigation system 104. Whilst again the upper panoramic screen part 89 remains unchanged and the indicators and elements in the left-hand area (l) and in the central area (z) are maintained, the right-hand area of the lower panoramic screen part 88 now contains measures and guidelines for setting and following the navigation for the passenger.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A panorama projection unit for a motor vehicle comprising:
   a three-dimensional panoramic screen having a spatial shape defined by a plurality of non-constant contour lines, wherein the panoramic screen includes first and second projection surfaces arranged in a non-parallel relationship;
   a plurality of projectors configured to project images onto a rear-side of the panoramic screen including a first projector configured to project a first image onto a rear-side of the first projection surface and a second projector configured to project a second image onto a rear-side of the second projection surface; and
   a central control unit configured to control the plurality of projectors such projected images are mapped on the three-dimensional panoramic screen without distortion.

2. The panorama projection unit according to claim 1, wherein the panoramic screen is at least partially adapted in its width to the internal front width of a vehicle.

3. The panorama projection unit according to claim 1, wherein the panoramic screen comprises a panoramic pane.

4. The panorama projection unit according to claim 3, wherein the panoramic screen comprises a semi-transparent rear-side coating on a rear-side of the panoramic pane.

5. The panorama projection unit according to claim 3, wherein the panoramic screen comprises an anti-reflection coating on a front-side of the panoramic pane.

6. The panorama projection unit according to claim 3, wherein the panoramic pane comprises a transparent plastic material.

7. The panorama projection unit according to claim 6, wherein the transparent plastic material is selected from the group consisting of polymethylmethacrylate (PMMA) and polycarbonate (pc).

8. The panorama projection unit according to claim 1, wherein the first projection surface is arranged adjacent to the second projection surface.

9. The panorama projection unit according to claim 1 wherein the central control unit is configured to control the first and second projectors such that the first and second projected images are mapped onto the three-dimensional panoramic screen without overlapping.

10. The panorama projection unit according to claim 1 wherein the first projector is positioned in a first projector row and the second projector is positioned in a second projector row, the first projector row being arranged above the second projector row.

11. The panorama projection unit according to claim 10, wherein the second projector is configured to project images and control elements onto a lower panoramic screen region and the first projector is configured to project images and control elements onto an upper panoramic screen region arranged above the lower panoramic screen region.

12. The panorama projection unit according to claim 11, wherein the lower panoramic screen region is at least partially spatially offset relative to the upper panoramic screen region and at least one horizontal storage surface is formed between the upper and the lower panoramic screen regions.

13. The panorama projection unit according to claim 12, wherein at least one front airbag is arranged beneath the at least one horizontal storage surface.

14. The panorama projection unit according to claim 1 wherein each of the plurality of projectors comprise at least one of light diodes, laser diodes, an array of light diodes and an array of laser diodes.

15. The panorama projection unit according to claim 1 wherein a video feed from a rear view camera showing a rear external area is projected onto an area of the panoramic screen when the motor vehicle is reversing.

16. The panorama projection unit according to claim 1, wherein an instrument reading including at least one of vehicle speed, engine speed, coolant temperature, fuel level, flashing light indicators, warning light indicators and lighting level indicators is projected onto an area of the panoramic screen visible on a driver's side of the vehicle.

17. The panorama projection unit according to claim 1 wherein the panoramic screen comprises control elements and projection backlit images associated therewith configured for menu selection.

18. The panorama projection unit according to claim 17, wherein menu selection is operatively connected with at least one of a communication system, a navigation system, and a driver assistance systems.

19. A motor vehicle in combination with a panoramic projection unit according to claim 1.

* * * * *